United States Patent [19]
Jacobs et al.

[11] Patent Number: 5,364,007
[45] Date of Patent: Nov. 15, 1994

[54] INERT GAS DELIVERY FOR REFLOW SOLDER FURNACES

[75] Inventors: Stephen W. Jacobs, Fleetwood; Gregory K. Arslanian, Chalfont; Bruce M. Adams, Macungie; John C. Ivankovits, Allentown; Donald J. Bowe, Macungie, all of Pa.

[73] Assignee: Air Products and Chemicals, Inc., Allentown, Pa.

[21] Appl. No.: 135,383

[22] Filed: Oct. 12, 1993

[51] Int. Cl.$^5$ .................. B23K 3/00; B23K 31/02
[52] U.S. Cl. ........................... 228/42; 228/219; 219/390; 432/59; 432/64
[58] Field of Search ............ 228/102, 219, 230, 42, 228/180.1; 432/59, 64, 206; 210/390, 388

[56] References Cited

U.S. PATENT DOCUMENTS

| | | | |
|---|---|---|---|
| 4,491,610 | 1/1985 | Mansour | 427/337 |
| 4,696,226 | 9/1957 | Witmer | 98/36 |
| 4,921,156 | 5/1990 | Hohnerlein | 228/37 |
| 5,044,542 | 9/1991 | Deambrosio | 228/37 |
| 5,048,746 | 9/1991 | Elliott et al. | 228/37 X |
| 5,076,487 | 12/1991 | Bandyopadhyay et al. | 228/219 |
| 5,121,874 | 6/1992 | Deambrosio et al. | 228/37 X |

OTHER PUBLICATIONS

Flattery, David K.; "Infrared Reflow Solder Attachment of Surface Mounted Devices"; *Connective Technology*; Feb. 1986; pp. 24–29.

Primary Examiner—P. Austin Bradley
Assistant Examiner—Jeanne M. Elpel
Attorney, Agent, or Firm—Geoffrey L. Chase; James C. Simmons; William F. Marsh

[57] ABSTRACT

An apparatus and method of reflow soldering electronic components, preferably to printed circuit boards, in an inert atmosphere to reduce solder defects and the need for flux or cleaning wherein the inert atmosphere is provided from a source of inert gas through several distribution lines which parallel the conveyor belt of a reflow solder furnace and supply each end of porous sintered metal diffuser tubes situated above the conveyor belt, as well as gas knives situated in baffle compartments at the inlet and outlet of the reflow solder furnace to strip barrier layers of oxygen atmosphere from the electronic components and preclude ingress of oxygen atmosphere into the reflow solder furnace.

16 Claims, 3 Drawing Sheets

INERT GAS DELIVERY FOR REFLOW SOLDER FURNACES

TECHNICAL FIELD

The present invention is directed to providing an inert atmosphere in a furnace for reflow soldering of electronic components. More particularly, the present invention is directed to providing a nitrogen inert gas in a non-turbulent manner in the heat chamber of a reflow solder furnace.

BACKGROUND OF THE PRIOR ART

Reflow soldering is employed extensively in the surface mount industries and particularly in the automated manufacture of printed circuit board assemblies. Generally, miniature electronic components are surface mounted on a printed circuit board to which a solder in a creamy or paste-like consistency has been applied by a method, such as screen printing, stenciling or dispensing.

The printed circuit board is then subjected to a sufficiently high temperature, generally 30°–50° C. greater than the melting point of the alloy, to cause the flux and the alloy in the solder to liquify and to contact the component so that upon subsequent cooling of the printed circuit board, the components are soldered in place on the board. The heat can be supplied by, for example, infrared, vapor phase, heated conveyor belt (hot belt) or convective means.

The solder paste is conventionally comprised of a soft powdered metal alloy dispersed in a liquid medium containing a flux, an organic solvent, and a thickening agent specially selected to impart the desired consistency to the mixture. Ideally, the flux component should be noncorrosive, thereby yielding flux residues after completion of soldering, which are themselves noncorrosive and nonconducting. In practice, however, such is not the case. Rosin-based flux materials, such as abietic acid-based flux, are used in most commercially available solders specifically formulated for use in the surface mount industries. These fluxes commonly contain activators, such as halides, particularly bromides, which leave corrosive and conductive residues requiring expensive and time-consuming removal techniques. Conventionally, these removal techniques utilize organic solvents, e.g., fluorochlorocarbons which give rise to environmental problems. As an alternative, aqueous systems have been tried for residue removal. However, due to poor wetting, it is difficult to obtain the penetration necessary with such systems to achieve the required cleaning. Additionally, removal of flux residues is difficult, particularly from areas of printed circuit boards beneath the components soldered thereto.

Rosin-based fluxes have additional disadvantages whether or not they contain conventional activators. For example, corrosive, rosin-based flux residues tend to be sticky, thereby inhibiting the automatic testing of the circuits and proving aesthetically objectionable.

The use of rosin-based or mildly activated rosin-based flux-containing solders can also result in poor wetting by the solder of the substrate and of components to be soldered depending upon the degree of oxidation on metallized regions and the oxygen content in the atmosphere.

Flux residues tend to be hygroscopic, thereby causing spattering, and some fluxes also undermine solder joint integrity by mechanisms such as permitting alloy particles in the solder to migrate from the solder site, giving rise to the formation of numerous small discrete balls of soft solder around the soldered joint, in effect creating electrical short circuits. Therefore, the industry has come to no-flux or no-clean solders used in low oxygen soldering environments.

U.S. Pat. No. 5,076,487 discloses the use of low oxidizing atmospheres for reflow soldering processes. The low oxidizing atmosphere comprises an inert gas with hydrogen wherein the hydrogen reduces the oxidation potential of water vapor and oxygen.

U.S. Pat. No. 5,044,542 discloses a wave soldering process, in contrast to reflow soldering, in which a hood is placed over the solder pot and a shield gas is dispensed above and below the conveyor for the elements to be soldered.

U.S. Pat. No. 4,921,156 discloses an additional wave soldering apparatus with an extended travel path through an enclosed tunnel. A protective nitrogen gas is dispensed within the tunnel.

U.S. Pat. No. 4,491,610 discloses a chamber for curing flat substrates in which an inlet knife and an outlet knife are positioned at the outer perimeters of the chamber.

U.S. Pat. No. 4,696,226 discloses a furnace with fluid barrier curtains at the inlet and outlet ends of the furnace. The fluid barrier curtains provide laminar flow based upon the orifice and vaned exhaust of the fluid barrier curtain. A gas, such as hydrogen, is introduced into the main portion of the furnace, while a gas, such as nitrogen, is used for the fluid barrier curtains.

The article "Infrared Reflow Solder Attachment of Surface Mounted Devices" by David K. Flattery appearing in *Connection Technology*, February 1986, pp 24–29, discloses at p 28, 3rd column, that the use of nitrogen or nitrogen and hydrogen are known in reflow solder furnaces.

Despite the efforts of the prior art to provide various furnaces and wave soldering operations with inert atmospheres, the art of reflow soldering still experiences difficulties in efficient soldering operations, disturbance of soldered components prior to the solidification of solder by localized high velocity gas currents, the efficient utilization of inert gases, and the need to adjust inerting operations and retrofit existing air, based reflow soldering furnaces. The present invention overcomes the shortcomings as will be set forth below in greater detail.

BRIEF SUMMARY OF THE INVENTION

The present invention is directed to a reflow solder furnace apparatus for soldering electronic components conveyed through said furnace in a hooded heating chamber, comprising: a furnace frame for supporting means for conveying electronic components through the heating chamber and to support a source of heat for reflow soldering; a heating chamber on the furnace frame with an inlet and outlet to introduce electronic components to be soldered by heating including the source of heat and the hood constituting at least a cover for the top of the heating chamber; conveying means situated on the furnace frame to support electronic components and to convey them through the hooded heating chamber; a first baffle compartment at the inlet of the heating chamber and a second baffle compartment at the outlet of the heating chamber; a source of an inert gas for inerting the heating chamber; paired distribution lines juxtaposed to each of two opposing sides of the conveying means for delivering inert gas to the heating chamber; one or more porous diffuser tubes connecting the paired distribution lines across the conveying means and situated above the conveying means for dispensing inert gas into the heating chamber; and an inert gas knife situated in each of the first and second and baffle compartments for dispensing inert gas onto the conveying means and to prevent outside atmosphere from entering the heating chamber.

Preferably, distribution lines comprise paired lines that are parallel to the sides of the conveying means.

Preferably, a manifold block connects the source of inert gas to the distribution lines.

Preferably, the porous diffuser tubes are a sintered metal) having microporosity.

Preferably, the inert gas knives are slotted tubes which dispense inert gas through the slots.

Preferably, the conveying means is selected from the group consisting of a metal mesh conveyor belt and an edge card conveyor.

Preferably, the source of heat is one or more infrared lamps.

Preferably, the knives are situated above the conveying means to dispense inert gas at an angle downward toward the conveying means and outward from the baffle compartments.

Preferably, the distribution lines have a plurality of connections for connecting the porous diffuser tubes to the lines to situate the porous diffuser tubes at varied positions in the heating chamber.

Preferably, the apparatus includes a gasket sealing means for providing a gas tight seal between the hood and a remainder of the heating chamber;

The present invention is also a method of soldering electronic components by reflow soldering in an inert gas atmosphere in a hooded heating chamber of a reflow solder furnace wherein the electronic components are conveyed through the heating chamber on a conveyor belt and heated to reflow a solder or solder paste, wherein the inert gas atmosphere is provided by delivering an inert gas from the source of inert gas through paired distribution lines juxtaposed to the conveyor belt and dispensing the inert gas through one or more porous diffuser tubes into the heating chamber to inert atmosphere around the electronic components as they are soldered to reduce solder defects and reduce the need for flux or cleaning, and further dispensing the inert gas through a first and a second inert gas knife, each situated in a baffled compartment at an inlet and outlet to the heating chamber to strip away oxygen-containing atmosphere and prevent the ingress of oxygen-containing atmosphere into the heating chamber.

Preferably, the inert gas is selected from the group consisting of nitrogen, carbon dioxide, helium, argon and mixtures thereof.

Preferably, the inert gas is nitrogen having a purity of at least 99.5%.

More preferably, the inert gas is nitrogen having a purity of at least 99.998%.

Preferably, the electronic components are soldered to a printed circuit board.

Preferably, the electronic components are heated by infrared radiation.

DETAILED DESCRIPTION OF THE INVENTION

Figure 1:
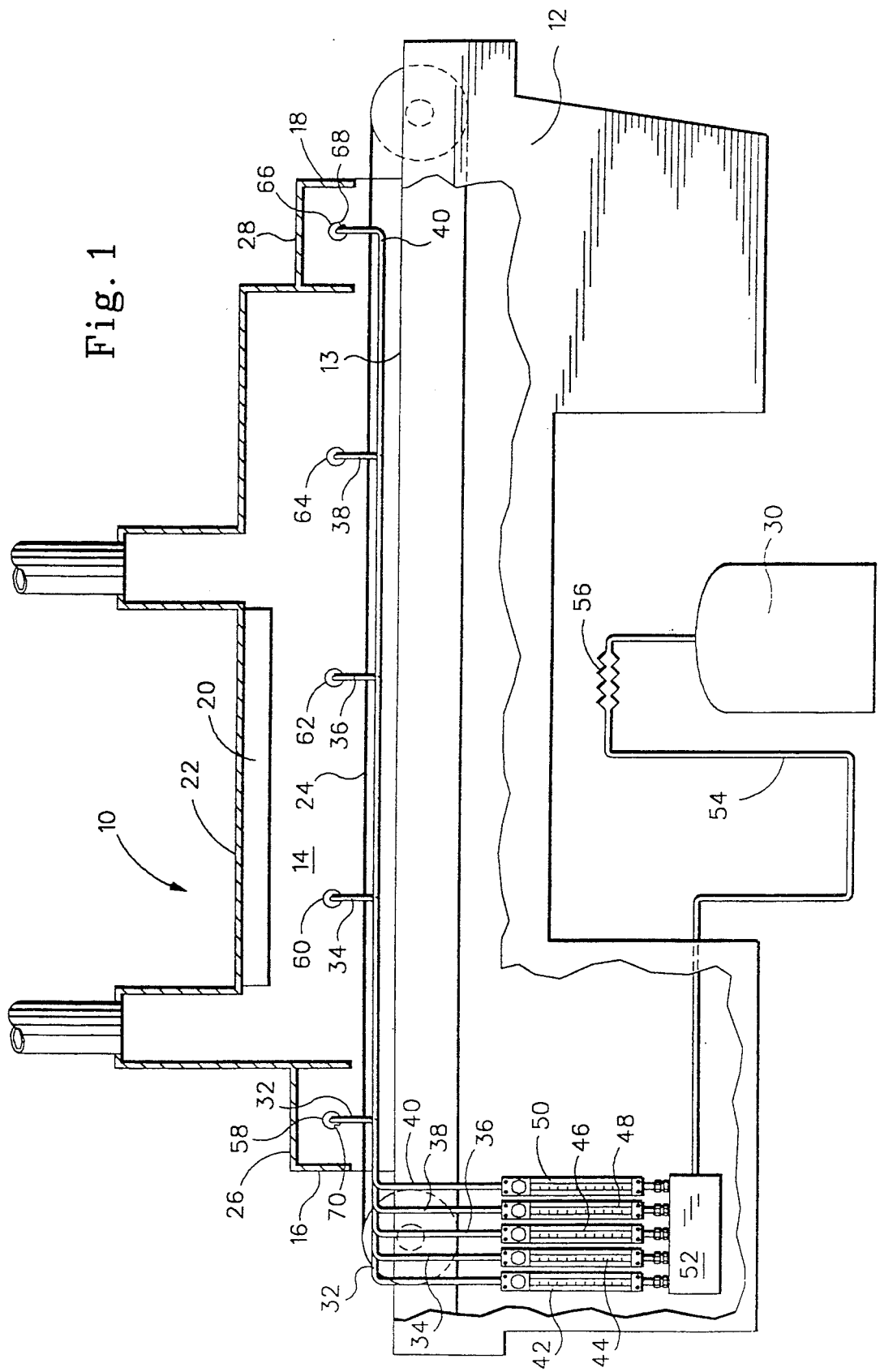
FIG. 1 is a side view in partial section of a preferred embodiment to the present invention.

The inert gas delivery and control system for reflow solder furnaces of the present invention allows electronic component and printed circuit board assemblers to introduce inert gas into a furnace, either by original design or by a readily fabricated retrofit of an existing noninerted furnace. This allows for a reduction of oxygen within the preheat and reflow zones of the furnace. A significant reduction in solder joint defects when using RMA pastes is also possible. The apparatus of the present invention also assists in the use of low residue and no-clean solder paste systems which eliminate the need for a post-soldering cleaning using chlorofluorocarbons.

The present invention allows manufacturers to introduce inert gas, such as nitrogen, carbon dioxide, helium or argon into soldering process atmospheres in various reflow solder furnaces, either originally manufactured without inert gas or manufactured with the provisions of the present invention. In the present invention, inert gas is introduced into a flow control panel and is disbursed to several porous diffuser tubes within the furnace. The diffuser tubes are located throughout the furnace preheat and reflow zones constituting a hooded heating chamber to insure low oxygen levels in the entire processing atmosphere. The inert furnace atmosphere allows users to more easily reflow printed circuit board soldering operations. Printed circuit board soldering using either traditional RMA solder paste and no-clean or low residue solder paste show improved reflow characteristics when reflowed under inert gases as administered with the present invention.

The present invention provides the following specific advantages, including inert gas knives producing a curtain of inert gas to reduce ambient atmosphere infiltration into the reflow solder furnace at lower total nitrogen flows; inlet and outlet baffle chambers which further assist to reduce infiltration of ambient atmospheres such as air; a plurality of porous sintered metal diffuser tubes for even, non-turbulent distribution of inert gas within the heating chamber of the solder reflow furnace; dual end feed of inert gas to the diffuser tubes to provide balanced even flow from parallel paired distribution lines; diffuser tubes situated above the electronic components being soldered to effectively bathe the components with inert gas; ease of placement and movement of the diffuser tubes allowing optimization of furnace inerting; high temperature insulation material to further reduce air or ambient atmosphere infiltration; gasket material at joints to increase the seal and fit of furnace hood components; modest modification of retrofit furnaces or adaptation in presently constructed reflow soldering furnaces to provide inert gas operation; and a system which is sufficiently generic and simple so as to be adaptable and modifiable for multiple furnace model use.

A particularly attractive form of reflow soldering is soldering using infrared heat as the source of heat for solder reflow. Infrared soldering is one method of attaching electronic components to printed circuit boards. Traditionally, the process involves screen printing a solder paste on a bare printed circuit board, placement of electronic components on the printed circuit board and the soldering of the components to the board through controlled heating from infrared radiation in a reflow solder furnace. Typically, the board is cleaned after soldering to remove flux residues left by the solder paste. The method of cleaning used depends on the solder paste employed. Cleaning methods include the following: (1) chlorofluorocarbons-based solvents such as Freons and 1,1,1-trichloroethane, (2) water cleaning, (3) terpene-based solvents, etc.

One form of reflow soldering which does not require post-soldering cleanup is soldering in the presence of low or ppm levels of oxygen by use of inert gas. Through the implementation of an inert gas for reflow soldering, the following benefits can be achieved: elimination of metal surface oxidation, reduction in overall soldering defects, improvement of first-pass soldering yields, reduction in labor costs, improved wetting, increased wetting force, decreased wetting times, reduction in flux polymerization and ease of inspection of soldered components.

In addition, recent international mandates, such as the Montreal Protocol, have limited the use of chlorofluorocarbon materials for solvent cleanup. Chlorofluorocarbons have been the most popular printed circuit board cleaning material in the past. In an effort to reduce the use of chlorofluorocarbons, the electronic packaging industry is attempting to find new methods to clean boards or to eliminate the cleaning step altogether. Water and terpene cleaning are interim methods of cleaning, while acceptable no-clean technology for reflow soldering is developed.

No-clean soldering is possible through the use of less aggressive fluxes contained in pastes. The purpose for using flux is twofold: (1) to chemically remove solder oxides, and (2) to protect the alloy from reoxidation during reflow. The presence of solder oxides hinders the wetting of the molten alloy, thereby affecting solderability. Air has been shown to oxidize molten alloys within the time-temperature regime of infrared solder reflow. Elimination of atmospheric oxygen by displacement with an inert atmosphere complements low residue, no-clean solder paste flux by protecting the tool ten solder from oxidation. This allows solder paste manufacturers to employ less aggressive flux in low residue solder paste systems.

Typical solders that are used in reflow solder furnaces and are amenable to the present invention are tin-lead combinations, preferably at an approximately 63%/37% composition. The addition of minor amounts of silver is also contemplated. Tin-bismuth solder combinations are also possible.

One advantage of the present invention is that many reflow solder furnace users desiring no-clean solder paste applications use inert gas atmospheres when fellow soldering in order to achieve optimal paste performance. However, a large percentage of the reflow solder furnaces in existence today do not have the capability to hold an inert atmosphere without allowing unacceptably high levels of air to infiltrate the processing area. The reflow solder furnace system of the present invention allows ready retrofit of such furnace designs for modification to maintain inert atmospheres within a reflow furnace. This provides the capability of using existing equipment without having to purchase new inert gas compatible equipment or to incorporate the design into currently manufactured furnaces and at significant savings.

The present invention comprises several critical elements as will be discussed below. Initially, the present invention utilizes a source of inert gas, such as nitrogen, which flows through a pressure-reducing flow run apparatus for control of inert gas to the reflow solder furnace. This apparatus lowers inert gas pressure from approximately 100 to 120 psi to the present invention's flowmeter operating pressure of 40 to 50 psig. The components that would typically make up the flow run are an isolation valve, a strainer, a pressure regulator, a pressure relief valve, a pressure gauge and a check valve.

The inert gas would also flow through a manifold block which functions as the distribution system for the inert gas. The gas is distributed from the manifold to an appropriate number of flowmeters for the size of the reflow solder furnace. The manifold could typically be fabricated from aluminum to accommodate threaded Swagelok fittings.

Flowmeters would be utilized to distribute the inert gas wherein each flowmeter has a maximum inert gas flow rate of 307 standard cubic feet per hour (SCFH) at 50 psig. The outlet side of each flowmeter has a union "T" Swagelok fitting that will supply inert gas to both ends of paired, preferably parallel, distribution lines feeding a diffuser tube. Exemplary materials of construction comprise ¼ inch polyflow tubing for connecting the flowmeters to the distribution lines.

A diffuser tube and distribution line assembly comprise a hollow sintered stainless steel tube of approximately ⅜ inch outside diameter that is welded to 314 stainless steel tubes of ¼ inch outside diameter at both ends of the diffuser tube. The latter tubes constitute the distribution lines that are juxtaposed or parallel to the reflow furnace conveyor belt. The distribution lines can have multiple outlets for diffuser tubes at different points along their length or they can, through couplings, be substituted for lines of various different lengths, so as to allow the placement of the diffuser tubes in the heating chamber at precise and adjustable locations depending on the particular requirements for inert gas on a particular reflow solder furnace. This is especially attractive in retrofits of reflow solder furnaces that were not originally designed for inert gas service. The sintered diffuser tube has a porosity range of 5 to 100 microns. A key to the present invention in providing even, non-turbulent flow is the supply of the diffuser tube from both of its ends through the distribution lines. The stainless steel tube is bent downward at 90° coming out of the diffuser tube and then bent at a 90° angle that carries the tube to the distribution lines. This configuration suspends the diffuser tube across the width of the process area in the heating chamber of the reflow solder furnace. Inert gas is supplied via ¼ inch outside diameter stainless steel tubing that is attached to the diffuser tube and distribution line assembly via Swagelok unions. The diffuser assemblies are placed inside the furnace preheat and reflow zones at locations throughout the process area to provide low oxygen containing process atmosphere.

In addition, for supply of inert gas to the reflow solder furnace, inert gas knives or slotted stainless steel tubes of preferably ⅜ inch outside diameter form inert atmospheric curtains at both the inlet and outlet of the hooded, heating chamber of the reflow solder furnace. The slots are preferably 1/64 to 1/16 inch wide by 0.100 to 0.750 inch long on a 1.25 inch center of the knives. Alternatively, perforated tubes with apertures of 1/64 to 1/32 diameter can be used. Each knife is supplied from both of its ends, typically via ⅛ inch polyflow tubing. The knives are located at a first baffle compartment at the inlet and a second baffle compartment at the outlet of the reflow solder furnace. The tubes are preferably positioned so that the slots are facing outward and downward at a 30° to 60°, preferably, 45° angle. This configuration of the knives reduces infiltration of air into the reflow solder furnace, as well as stripping barrier layers of oxygen from near the surface of the electronic components to be processed.

The inert gas knives are located inside the first baffle compartment and the second baffle compartment of the respective inlet and outlet of the hood of the heating chamber of the present invention adaptation of a reflow soldering furnace. Typically, the first and second baffle compartments are constructed from galvanized sheet metal. The inert gas knives are located near the outer edge or directed toward the outer edge of the opening or apertures where the conveyor belt bearing electronic components passes through the hood of the reflow solder furnace. The baffle compartments and the inert gas knives reduce the infiltration of ambient atmosphere, such as air carrying oxygen into the reflow solder furnace, affording low oxygen levels in the preheat and reflow furnace atmospheres of the heating chamber. In addition, when an edge card conveyor, which carries boards only by contact with their edges, is used as the conveyor of circuit boards, adjustable baffles can be situated at the entrance and exit at the baffle compartments to adjust the lateral dimension or width of the entrance to the baffle compartment.

In the situation where the reflow solder furnace comprises a hinged hood creating the top half of the heating chamber of the reflow solder furnace, it is important particularly in retrofit adaptations of the present invention to provide a gasket, preferably having high temperature stable rubber material with an adhesive backing which is ⅛ to ¼ inch thick by 0.5 to 2.5 inches wide. This gasket is placed on the contact surfaces of the hinged hood of the reflow solder furnace to again reduce opportunities for air infiltration. The sealing effect is provided by the weight of the hood or lid.

It is also useful to provide high temperature insulation materials in reflow solder furnaces that are not built for initial inert gas operation in light of the numerous areas within the preheat and reflow zones of the heating chamber which are open to the ambient atmosphere from under the base or furnace frame of the reflow solder furnace. These areas typically consist of gaps in insulation placed between infrared panels and the preheat and reflow zones, as well as optical sensor ports. These areas allow for infiltration of air into the reflow solder furnace, compromising the inert atmosphere. The high temperature insulation material, typically composed of amorphous silica products, fills these voids to greatly reduce air infiltration.

The key advantage of the present invention is using porous metal diffuser tubes connected to the parallel paired distribution lines which can be adjusted to different spacial arrangements readily within a reflow solder furnace without effecting the heating chamber, particularly the hood or conveyor of the reflow solder furnace. The arrangement of the diffuser tubes and distribution lines are advantageous for retrofit installation and for removal to conduct maintenance or future modification.

Providing the diffuser tubes by means of the distribution lines above the path of the electronic components conveyed through the furnace by the conveyor belt allows for uniform distribution of inert gas in a non-turbulent manner so as not to dislodge unsoldered electronic components prior to the reflow of solder and to avoid entrainment of oxygen by otherwise turbulent flow. This uniformity is enhanced by the supply of inert gas from both ends of the diffuser tube as it is situated above the conveyor belt. In addition, the physical arrangement of the distribution lines within the furnace and the heating chamber provides a preheat function for the inert gas being dispensed, which further contributes to a uniform temperature, atmosphere and environment in the area of the soldering operation within the heating chamber. With this system, oxygen levels have been reduced to less than 100 ppm in the reflow zone of the heating chamber.

Figure 2:
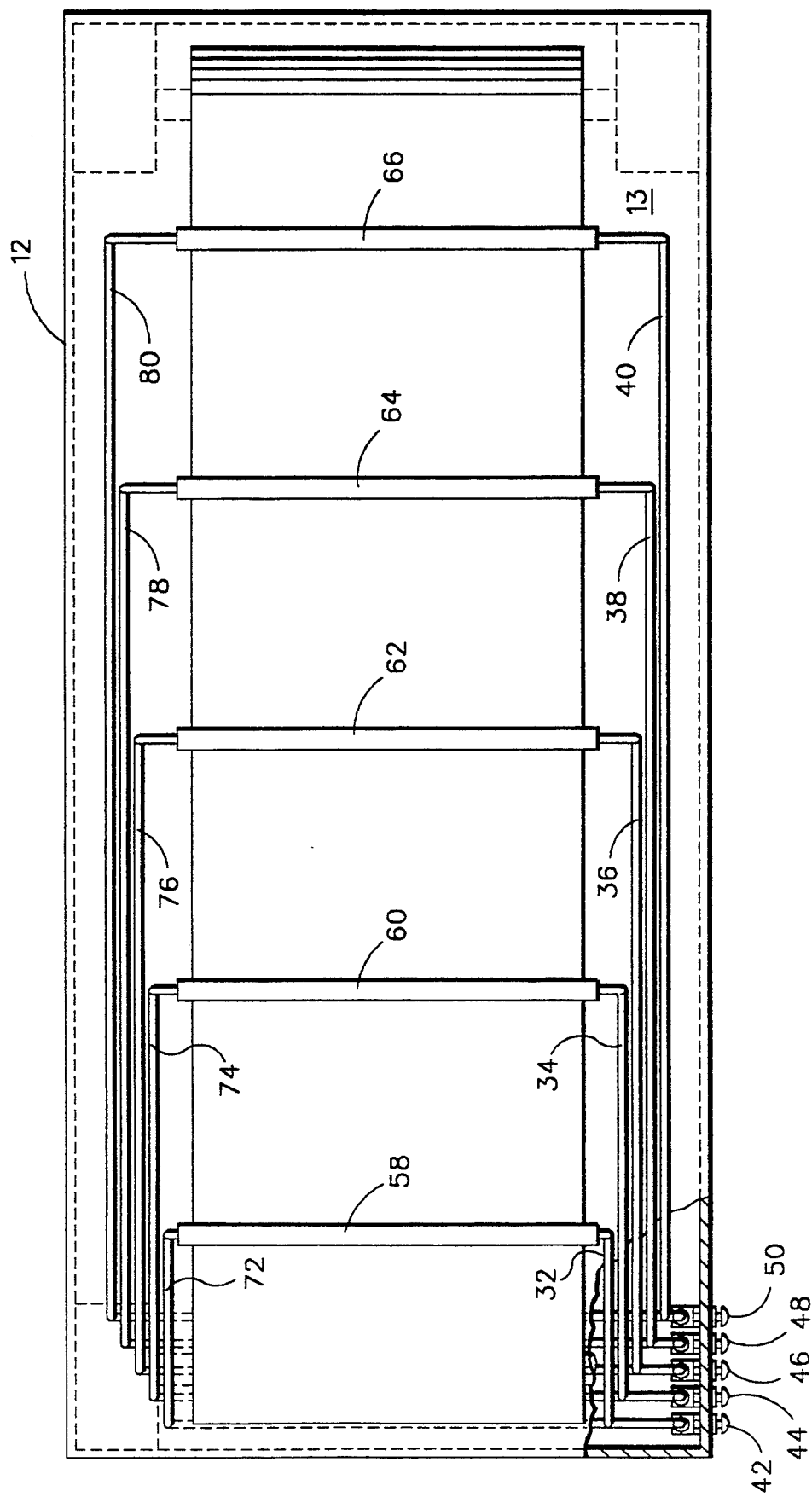
FIG. 2 is a top view of a preferred embodiment of the present invention without the hood.

The present invention will now be described in greater detail with reference to a particular preferred embodiment as illustrated in the drawings. With reference to FIG. 1, a reflow solder furnace 10 is illustrated which is supplied with nitrogen inert gas from vessel 30 or alternatively house nitrogen of the facility where the soldering operation is performed through flow control and pressure reduction apparatus 56 and line 54. This inert gas is introduced into a manifold block 52 which provides for discrete supply of nitrogen through various conduits from the single main line 54. Although five separate lines are shown emanating from the manifold block 52, it is understood that more or less distribution could be performed. The nitrogen inert gas then flows through flow control meters 42, 44, 46, 48 and 50, respectively, for each of the distribution lines emanating from the flow control meters. The flow control meters allow precise metering of nitrogen inert gas to each of a plurality of dispensing points to be described below. The distribution lines include lines 32, 34, 36, 38 and 40 paired to branch distribution lines 72, 74, 76, 78 and 80 (viewed in FIG. 2), respectively. Each of these distribution lines penetrates the furnace upper surface 13 outside the hood 22 and enters the heating chamber 14 at the opening of the furnace at the entrance 16 or exit 18 of the heating chamber 14 so that two juxtaposed or parallel, paired branches of each distribution line proceed down either side of the furnace frame 12, as best illustrated in FIG. 2.

Figure 4:
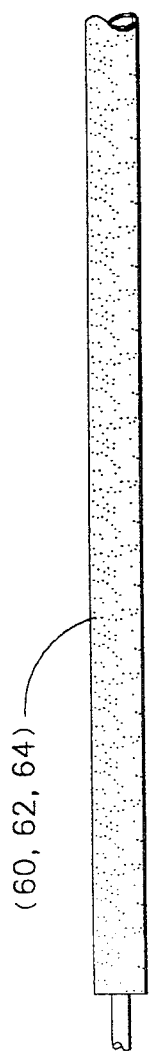
FIG. 4 is a plan view of the diffuser tubes of a preferred embodiment of the present invention.

Within the reflow solder furnace situated above a conveyor belt 24 for electronic components to be soldered are an array of dispensing means comprising porous sintered metal diffuser tubes 60, 62 and 64, best viewed in FIG. 4, which are fed simultaneously from each end of such tubes through parallel, branched distribution lines 34/74, 36/76 and 38/78, respectively. The combination of simultaneous feed of nitrogen inert gas from both ends of the diffuser tube and the porous sintered metal construction provides for very fine non-turbulent and consistent flow of inert gas onto the delicate electronic components to be soldered. It should be understood that as the electronic components enter the reflow soldered furnace of the present invention, they are attached at best by the tackiness of solder paste, and during the reflow operation, this adhesion may be compromised until the solder that has reflowed has solidified once again at cooler temperatures after the reflow solder furnace. Therefore, it is critical for high yields and low defects to provide inert gas in the reflow stage of the solder in a gentle non-turbulent form while simultaneously performing complete and thorough inerting of the reflow zone for best performance. Therefore, the use of dual-end fed porous diffuser tubes arranged above the electronic components to be soldered on a conveyor belt has been found to be particularly appropriate for acceptable high yield solder operations.

These porous diffuser tubes 60, 62 and 64, shown in FIG. 4, are located within a heating chamber 14, defined by a hood 22 and the reflow solder furnace frame 12 upper surface 13. Within this chamber, the diffuser tubes maintain an inert atmosphere while sources of heat, such as infrared radiant lamps 20, provide the necessary conditions to reflow solder paste so as to solder electronic components to one another or most preferably solder of electronic components to a printed circuit board that is preprinted with solder paste.

Figure 3:
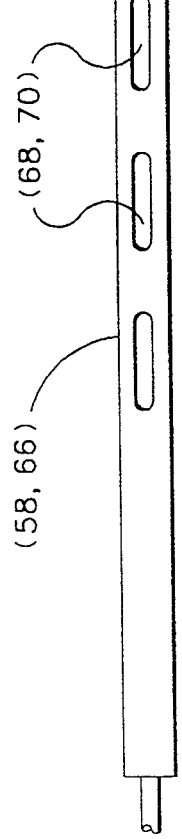
FIG. 3 is a plan view of the inert gas knives of a preferred embodiment of the present invention.

An important aspect of maintaining the inert atmosphere of the heating chamber 14 is the inclusion of the first and the second baffle compartments 26 and 28, respectively, at the inlet 16 and outlet 18 of the heating chamber of the reflow solder furnace. As can be seen, these baffle compartments are fully baffled both on their interior side and their exterior side to prevent undue turbulence from entering the heating chamber where solder is in a molten state during reflow conditions and electronic component alignment could be jeopardized from such turbulent flow. Within the baffle compartments are situated inert gas knives 58 and 66, best viewed in FIG. 3, comprising tubes similar to the diffuser tubes, but having slotted apertures 70 and 68, respectively, aligned preferably at a 45° angle downward and outward to the surface of the conveyor belt 24 or edge card conveyor, so as to direct a forceful stream of inert gas at the inlet 16 and outlet 18, respectively, of the reflow solder furnace. This flow, which may reach turbulent flow conditions, is designed to strip barrier layers of oxygen near the surface of components and printed circuit boards and preclude ambient atmosphere infiltration as they enter the furnace and leave the furnace. Under these conditions the components are either on the entry side adhered by the stickiness or tackiness of solder paste or the reflowed solder has resolidified at the outlet or downstream side of the reflow solder furnace. Therefore, inert gas knives having stronger gas flow than the porous diffuser tubes are acceptable. In addition, this stronger flow of gas directed through slots rather than porous surfaces achieves the result of avoiding infiltration of ambient atmosphere, particularly air bearing oxygen into the heating chamber 14 in addition to stripping barrier layers of oxygen bearing gas near the surface of the components to be soldered.

In typical reflow solder furnaces, the hood 22 is sectioned and is hinged for open access for service and observation. In order to ensure the inert character of the heating chamber, these sections of the hood, if hinged for opening, co-act with the furnace frame 12 through gasket sealing material appropriately arranged around the perimeter of the hood where it contacts the furnace frame. In addition, amorphous silica based insulation is provided, but not illustrated, in the furnace frame 12 around various components which would constitute apertures or sources of infiltration of ambient atmosphere from below.

The benefit of the present invention, as illustrated, is the provision of individually controlled inert gas dispensing to various points of the solder reflow furnace through thorough, equal, but non-turbulent, flow by use of parallel distribution lines which feed both ends of porous diffuser tubes. These tubes are most appropriately situated above the conveyor belt to dispense inert gas, such as nitrogen, gently downward on the electronic components to be soldered. This also allows for retrofit of existing non-inert reflow solder furnaces with the apparatus of the present invention without making significant adaptations or modifications to the reflow solder furnace structure. The inclusion of the first baffle compartment and the second baffle compartment and inert gas knives also lends itself to easy addition as a retrofit to existing non-inert reflow furnaces. Although the apparatus lends itself to retrofit operations, it is understood that the apparatus of the present invention could be fabricated into a new equipment structure and still provide the same benefits of ease of fabrication, avoidance of space incompatibility with existing styles of furnace structures, thorough balanced non-turbulent administration of inert nitrogen, safe and effective inert gas curtaining of the inlet and outlet of a reflow solder furnace in areas where greater flow rates are permissible and appropriately baffled, and discrete control of each dispensing unit all with an economical equipment utilization.

The present invention has been set forth with regard to a specific preferred embodiment however, it is understood that the scope of the present invention should be ascertained from the claims which follow.

We claim:

1. A reflow solder furnace apparatus for soldering electronic components conveyed through said furnace in a hooded heating chamber, comprising:
   (a) a furnace frame for supporting means for conveying electronic components through said heating chamber and to support a source of heat for reflow soldering;
   (b) a heating chamber on said furnace frame with an inlet and an outlet to introduce electronic components to be soldered by heating including said source of heat and a hood constituting at least a cover for the top of said heating chamber;
   (c) conveying means situated on said furnace frame to support electronic components and to convey them through said hooded heating chamber;
   (d) a first baffle compartment at said inlet of said heating chamber and a second baffle compartment at said outlet of said heating chamber;
   (e) a source of an inert gas for inerting said heating chamber;
   (f) paired distribution lines juxtaposed to each of two opposing sides of said conveying means for delivering inert gas to said heating chamber;
   (g) one or more porous diffuser tubes connecting said paired distribution lines across said conveying means and situated above said conveying means for dispensing inert gas into said heating chamber; and
   (h) an inert gas knife situated in each of said first and second baffle compartments for dispensing inert gas onto said conveying means and to prevent outside atmosphere from entering said heating chamber.

2. The apparatus of claim 1 wherein said distribution lines comprise paired lines that are parallel to said sides of said conveying means.

3. The apparatus of claim 1 wherein a manifold block connects said source of inert gas to said distribution lines.

4. The apparatus of claim 1 wherein said porous diffuser tubes are a sintered metal having microporosity.

5. The apparatus of claim 1 wherein said inert gas knives are slotted tubes which dispense inert gas through said slots.

6. The apparatus of claim 1 wherein said conveying means is selected from the group consisting of a metal mesh conveyor belt and an edge card conveyor.

7. The apparatus of claim 1 wherein said source of heat is one or more infrared 1 amps.

8. The apparatus of claim 1 wherein said knives are situated above said conveying means to dispense inert gas at an angle downward toward said conveying means and outward from said baffle compartments.

9. The apparatus of claim 1 wherein said distribution lines have a plurality of connections for connecting said porous diffuser tubes to said lines to situate said porous diffuser tubes at varied positions in said heating chamber.

10. The apparatus of claim 1 including gasket sealing means for providing a gas tight seal between said hood and a remainder of said heating chamber.

11. A method of soldering electronic components by reflow soldering in an inert gas atmosphere in a hooded heating chamber of a reflow solder furnace wherein said electronic components are conveyed through said heating chamber on a conveyor belt and heated to reflow a solder or solder paste wherein said inert gas atmosphere is provided by delivering an inert gas from a source of inert gas through paired distribution lines juxtaposed to said conveyor belt and dispensing said inert gas through one or more porous diffuser tubes into said heating chamber to inert an atmosphere around said electronic components as they are soldered to reduce solder defects and reduce the need for flux or cleaning and further dispensing said inert gas through a first and a second inert gas knife each situated in a baffled compartment at an inlet and an outlet to said heating chamber to strip away oxygen containing atmosphere and prevent the ingress of oxygen containing atmosphere into said heating chamber.

12. The method of claim 11 wherein said inert gas is selected from the group consisting of nitrogen, carbon dioxide, helium, argon and mixtures thereof.

13. The method of claim 12 wherein said inert gas is nitrogen having a purity of at least 99.5%.

14. The method of claim 12 wherein said inert gas is nitrogen having a purity of at least 99.998%.

15. The method of claim 11 wherein said electronic components are soldered to a printed circuit board.

16. The method of claim 11 wherein said electronic components are heated by infra-red radiation.

* * * * *